Louis Miller INVENTOR.

BY Arthur H. Sturges
Attorney

Oct. 13, 1953  L. MILLER  2,655,129
CHINCHILLA CAGE
Filed March 7, 1951  2 Sheets-Sheet 2

Louis Miller INVENTOR.
BY Arthur H. Sturges
Attorney.

Patented Oct. 13, 1953

2,655,129

UNITED STATES PATENT OFFICE 2,655,129

CHINCHILLA CAGE

Louis Miller, Wathena, Kans.

Application March 7, 1951, Serial No. 214,265

4 Claims. (Cl. 119—17)

This invention relates to a pen, cage or housing for animals of the costly fur bearing type and particularly where animals are raised for profit in the home, and in particular a combination of coacting cages where the animals are locked in one cage while the other is cleaned and treated, and wherein the young animals may be retained in one cage until they are partly grown.

The purpose of this invention is to provide a complete cage combination particularly adapted for raising chinchillas, that may be manufactured and sold by quantity production, and that gives the inexperienced operator the most efficient type of cage.

Mated chinchillas, guaranteed by professional dealers, are not only very costly, but are very delicate, and must be handled with extreme caution. A cage built by the average layman may, therefore, prove a costly experiment. With this thought in mind this invention contemplates a rectangular-shape housing having side and end walls, a cover and also a base, formed of wire mesh with a catch pan removably mounted below the base, and a similarly formed housing, preferably of a smaller size positioned at one end of the former housing and having communicating doors between the said housings.

The object of this invention is, therefore, to provide a cage or container for housing two mated chinchillas, in which the parts are so arranged that the animals may have proper care and attention with the least possible time and attention of an operator and at the least possible cost.

Another object of the invention is to provide a combination animal cage in which each section of the cage may be cleaned and sterilized while the animals are in the other section.

A further object of the invention is to provide an improved animal cage having two cooperative sections which is of a simple and economical construction.

Other features and advantages of the invention will appear from the following description taken in connection with the drawings, wherein.

Figure 1:
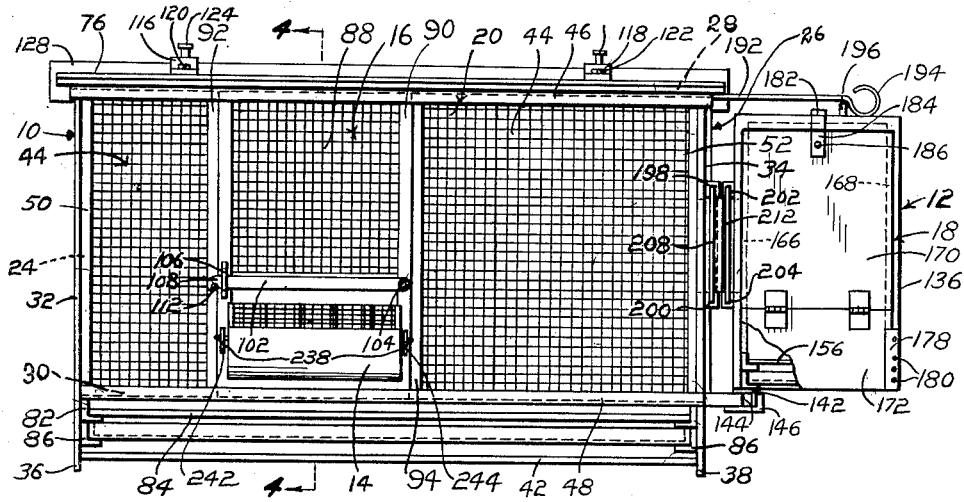
Figure 1 is a front elevational view of the cage showing the two sections assembled and showing a feed trough positioned in the lower part of the front panel.

Referring now to the drawings wherein like reference characters denote corresponding parts the combination animal cage of this invention includes a main wire mesh section 10, an auxiliary section 12, of plastic or the like, a feed trough 14, and doors 16 and 18.

The main cage is formed with a wire mesh front wall 20, a similar rear wall 22, end walls 24 and 26, a top or cover 28, and a base or floor 30. The front wall is provided with angle iron corners 32 and 34 having downwardly extended supporting ends 36 and 38, and the upper ends of the angles 32 and 34 are connected with an angle 40 with a rod 42 connecting the extended lower ends.

The front wall is covered with wire mesh 44, the upper and lower edges of which are mounted in channels 46 and 48, respectively, and the edges are held in similar channels 50 and 52. The edges of the wire mesh of the end wall 24 are held in a similar channel iron rectangular-shape frame 54, and the channels of the frame are secured to the corner posts by welding.

Figure 3:
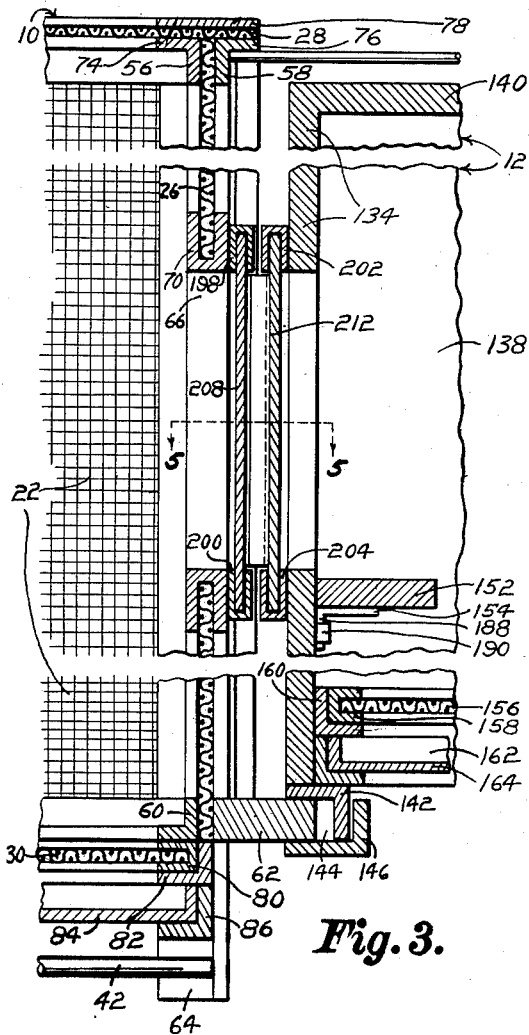
Figure 3 is a longitudinal section on an enlarged scale taken on line 3—3 of Figure 2, illustrating the connecting elements of the two sections of the cage, and with the ends of the sections broken away.
Figure 4:
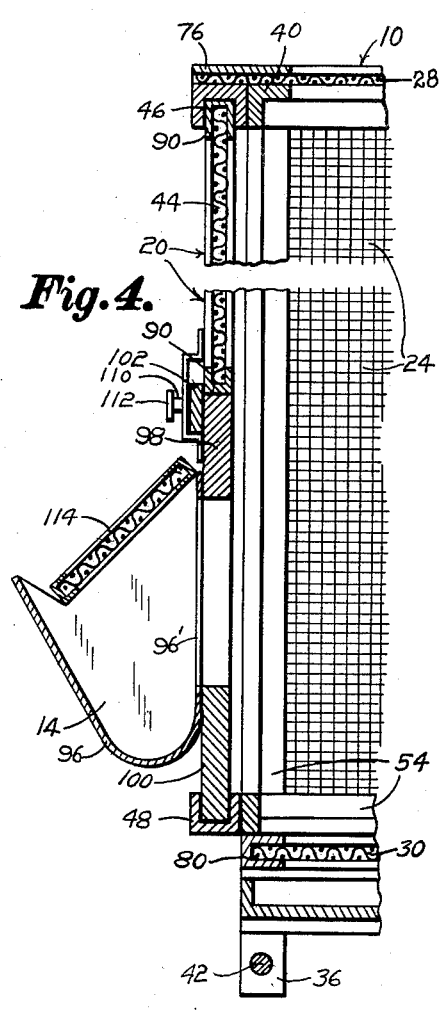
Figure 4 is a cross section taken on line 4—4 of Figure 1 showing the construction of the front wall of the main cage with the feed trough mounted therein and with the rear portion of the cage broken away.

The wire mesh panel 26 forming the opposite end of the main cage is formed, as illustrated in Figure 3, with the upper edge mounted between angles 56 and 58 and the lower edge is held against an angle 60 by a horizontal bar 62 which extends outwardly to provide a seat for the auxiliary cage. The edge of the panel 26 is secured to the corner post 34 at the front, and the edge at the rear is secured to a similar corner post 64. The intermediate part of the panel 26 is provided with door openings 66 and 68, and frames 70 and 72, which are channel-shape in cross section, bind the edges of the wire mesh around the door openings.

Angles similar to the angles 56 and 58 extend across the ends and back of the cage 10 and the cover panel 28, also of wire mesh, is positioned on the horizontally disposed flanges 74 and 76 of the angles 56 and 58, with a binding strip 78 positioned on the edge of the cover panel. The edge of the panel 28, at the front is supported by the angle 40 and the channel 46.

The wire mesh floor 30 of the main cage is provided with a continuous channel-shape frame 80, the ends and rear edge of which are held in an angle 82, and the drip pan 84, positioned below the floor, is supported at the ends by angles 86.

The door 16 of the front wall 20 is formed with a wire mesh panel 88 having a channel binding 90, and the door is positioned between spaced vertically disposed struts 92 and 94. A substantially U-shape plate 96 provides the feed trough 14 and this is positioned against an upper bar 98 and a lower bar 100 in the lower part of the door frame and between the struts 92 and 94. The bar 100 is slidably mounted in the channel 48, and the upper bar 98 is held by a latch bar 102, pivotally mounted at one end by a pin 104 on the frame. The opposite end of the latch bar 102 extends through a loop 106 and a notch 108 in the lower edge thereof drops over a pin 110 having a head 112. The inner wall of the feed trough is provided with an opening 96' that registers with the open space between the bars 98 and 100, and the open outer end of the trough is covered with a frame 114 having wire mesh therein.

Figure 2:
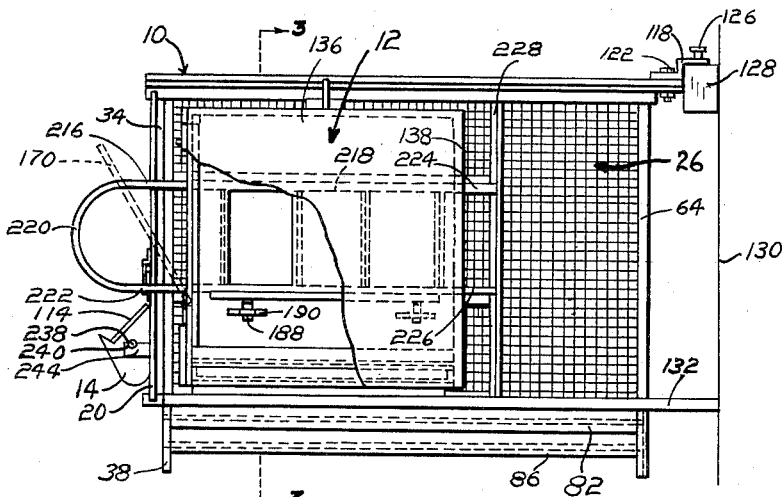
Figure 2 is an end view of the assembled sections with part broken away showing part of the door between the two sections and also showing the loop providing a handle for operating the door.

The upper edge of the main cage is provided at the rear with clips 116 and 118 that are secured to the frame by bolts 120 and 122, and in the upper ends of the clips are screws or nails 124 and 126, respectively, for holding the cage to a beam 128 on a wall 130, as shown in Figure 2. The lower end of the cage is spaced from the wall by struts 132 positioned at suitable points thereon.

The auxiliary section or cage 12 is formed with an inner side wall 134, an outer side wall 136, an end wall 138 and a top 140. A clip angle or member 142 is secured to the lower edge of the inner wall 134 with the vertical leg thereof freely positioned in a groove 144 of an angle 146 carried by the outer edge of the bar 62. The wall 134 is also provided with door openings 148 and 150 that are positioned to register with the door openings 66 and 68 of the end panel 26 of the main cage, and a perch 152 is supported on the inner surface of the wall 134 by brackets 154, which position the perch just below the lower ends of the door openings.

The cage 12 is also provided with a wire mesh or foraminous floor 156 the edges of which are secured in a channel frame 158, and the edges of the frame 158 are mounted in angles 160, which slidably hold the floor whereby it may readily be removed and replaced. A drip pan 162 is also slidably supported in angles 164 on the inner surfaces of the side walls of the auxiliary cage.

The edges of the side walls 134 and 136 at the open end of the cage 12 are provided with recesses 166 and 168 that receive the edges of doors 170 and 172, which are connected by hinges 174 and 176 providing an end wall, the lower door 172 being held by cleats 178 attached to the edges of the side walls by screws 180, and the upper door 170 being held by a spring latch 182 that coacts with a keeper 184 that is secured to the outer surface of the door by a screw 186. By this means the doors are retained in the upper or closed position as shown in Figure 1, until released by the latch.

The perch 152 may be removed to facilitate cleaning the cage, the brackets 154 having downwardly extended tongues 188 that are removably held in sockets 190 on the inner surface of the wall 134.

The cage 12 is suspended from the main cage with the angle 142 on the lower inner corner thereof slidably retained in the groove 144 and the upper end is held by a spring arm 192 having a finger loop 194 on the outer end, which snaps over a projection or lug 196 on the upper end of the cage. The arm 192 is secured to the angle 58 on the upper edge of the end wall 26 of the main cage.

The door framing between the cages includes spaced parallel tracks 198 and 200 on the end wall 26 of the main cage and similar tracks 202 and 204 on the inner wall 134 of the cage 12. The tracks are channel shape in cross section and doors 208 and 210, which in the closed position register with the door openings 66 and 68 of the wall 26, are slidably mounted through the upper and lower edges thereof in the channels forming the tracks 198 and 200. Similar doors 212 and 214 are slidably mounted, also through the upper and lower edges thereof, in the tracks 202 and 204 of the cage 12.

The upper edges of the doors 208 and 210 are connected by an upper arm 216 of a rod 218 formed to provide a loop or handle 220 that extends at the front of the cage, and the lower arm 222 thereof connects the lower edges. The inner ends 224 and 226 of the arms of the rod extend beyond the side of the door 210 to engage an outwardly extended flange of a vertically disposed angle 228 which is mounted on the outer surface of the end wall 26 and to which the ends of the tracks 198 and 200 are connected. The doors may, therefore, be moved to open and closed positions by the handle 220.

Figure 5:
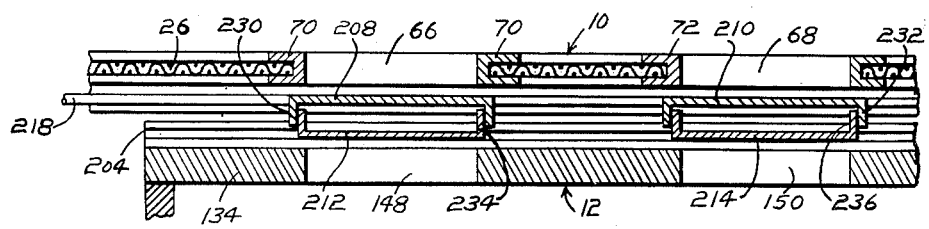
Figure 5 is a sectional plan through the connecting ends of the sections of the cage taken on line 5—5 of Figure 3 illustrating the construction of the doors and framing therefor.

The doors 208 and 210 of the main cage 10 are provided with outwardly extended flanges 230 on the sides of the door 208, and 232 on the sides of the door 210, and these flanges overlap corresponding flanges 234 of the door 212, and 236 of the door 214, as shown in Figure 5, whereby the doors of the cage 12 are actuated with the doors of the cage 10. When the cage 12 is disengaged from the cage 10 by releasing the latch provided by the spring arm 192 and the lug 196 the flanges of the doors separate whereby the doors remain in either the open or closed positions.

With the parts arranged in this manner both cages may be used together with the smaller cage used as a nest for the young animals and the animals may be retained in either cage while the other cage is cleaned and sterilized. Feeding and watering means, such as the feed trough 14 which is supported by pins 238 in notches 240 of outwardly extending arms 242 and 244, may also be provided for the auxiliary cage 12, if desired.

From the foregoing description it is thought to be obvious that a chinchilla cage constructed in accordance with this invention is particularly well adapted for use by reason of the convenience and facility with which it may be assembled and operated, and it will also be obvious that modifications may be made in the invention without departing from the principles and spirit thereof, and for this reason, I do not wish to be understood as limiting myself to the precise arrangement and formation of the several parts therein, as shown and described, in carrying out my invention in practice, except as claimed.

Having thus fully described the invention what

I claim as new and desire to secure by Letters Patent, is:

1. In an animal cage the combination which comprises a main wire mesh box-like section having spaced door openings in one end thereof, parallel tracks mounted on the end of the section in which the door openings are provided and positioned at the upper and lower ends of the said openings, doors slidably mounted in said tracks, an auxiliary box-like section of the cage having spaced door openings in a side wall thereof positioned against the end wall of the main section in which the door openings are positioned, means removably suspending the auxiliary section from the main section, parallel tracks mounted on the side of the auxiliary section in which the door openings are positioned and located to correspond with the tracks of the main section, doors slidably mounted in the tracks of the auxiliary section, and means actuating the doors of the auxiliary section with the doors of the main section of the cage.

2. In an animal cage the combination which comprises a main wire mesh box-like section having spaced door openings in one end thereof, parallel tracks channel-shape in cross section, mounted on the end of the main section in which the door openings are provided and positioned above and below said openings, doors slidably mounted in said tracks, an auxiliary box-like section having spaced door openings in a side wall thereof positioned to register with the door openings of the end wall of the main section, means mounting the auxiliary section on the main section with the door openings of the sections in registering relation, parallel tracks, channel-shape in cross section, mounted on the side of the auxiliary section in which the door openings are provided and positioned to correspond with the tracks of the main section, doors slidably mounted in the tracks of the auxiliary section, and means actuating the doors of the auxiliary section with the doors of the main section.

3. In an animal cage, the combination which comprises a main wire mesh box-like section having spaced door openings in one end thereof, parallel tracks channel-shape in cross section positioned at the upper and lower ends of the door openings and mounted on the end of the said main section, doors slidably mounted in the tracks and having outwardly extended flanges on the vertical side edges thereof, a loop providing a handle extended at the front of the main section and having arms connected to the upper and lower ends of the doors, an auxiliary box-like section having spaced door openings in one side thereof positioned to register with the door openings of the end wall of the main section, parallel tracks channel-shape in cross section positioned at the upper and lower ends of the door openings of the auxiliary section and mounted on the side wall thereof in which the door openings are positioned, doors having flanges on the vertical sides thereof slidably mounted in the tracks of the auxiliary section and positioned with the flanges thereof extended between the flanges of the doors of the main section whereby the doors of the auxiliary section are actuated with the doors of the main section, a horizontal bar having a groove in the outer edge positioned on the end of the main section in which the door openings are positioned, a flange on the auxiliary section positioned in the said groove, and a spring latch extended from the said main section for engagement with the auxiliary section for retaining the auxiliary section in position on the end of the main section.

4. In an animal pen, the combination which comprises a main cage including a box-like frame having a base, a top, side and end walls, and a wire mesh covering, an auxiliary cage having a floor, a top, side and end walls, and a projecting lug on said top, a horizontally disposed bar mounted on the lower edge of one of the end walls of the main cage and extended from said wall, said bar having a groove in the extended edge thereof, a member mounted on the lower edge of the inner side wall of the auxiliary cage and extended into the groove of the horizontal bar, a spring arm extended from the main cage and positioned to snap over the lug of the auxiliary cage for retaining the inner side wall of the auxiliary cage in meeting relation with the end wall of the main cage on which said horizontal bar is positioned, said meeting inner side wall of the auxiliary cage and end wall of the main cage having laterally spaced registering openings therein, parallel tracks mounted on said meeting walls and positioned above and below said openings, pairs of connected doors slidably mounted in the tracks on the end wall of the main cage and inner side wall of the auxiliary cage, respectively, said doors on the inner side wall of the auxiliary cage having flanges extended from the vertical edges and the doors on the end wall of the main cage also having flanges extended from the vertical edges, said flanges of the doors on the end wall of the main cage overlapping the flanges of the doors on the inner side wall of the auxiliary cage whereby the doors of the auxiliary cage are actuated by the doors of the main cage, and means for actuating the doors of the main cage.

LOUIS MILLER.

References Cited in the file of this patent

UNITED STATES PATENTS

| Number | Name | Date |
|---|---|---|
| 405,008 | Butterick | June 11, 1889 |
| 849,433 | Sprague | Apr. 9, 1907 |
| 1,005,886 | Ruff | Oct. 17, 1911 |
| 1,196,483 | Riggin et al. | Aug. 29, 1916 |
| 1,843,141 | Orth et al. | Feb. 2, 1932 |
| 1,857,246 | Kleckner | May 10, 1932 |